United States Patent [19]
Kita

[11] Patent Number: 5,337,629
[45] Date of Patent: Aug. 16, 1994

[54] CONTINUOUSLY VARIABLE TRANSMISSION WITH CORRECTED DIFFERENTIAL PRESSURE IN A LOW SPEED MODE

[75] Inventor: Yasuo Kita, Kyoto, Japan
[73] Assignee: Shimadzu Corporation, Kyoto, Japan
[21] Appl. No.: 915,825
[22] PCT Filed: Nov. 27, 1991
[86] PCT No.: PCT/JP91/01624
  § 371 Date: Jul. 28, 1992
  § 102(e) Date: Jul. 28, 1992
[87] PCT Pub. No.: WO92/09833
  PCT Pub. Date: Jun. 11, 1992

[30] Foreign Application Priority Data
Nov. 30, 1990 [JP] Japan .................. 2-338924
Nov. 30, 1990 [JP] Japan .................. 2-338925

[51] Int. Cl.$^5$ ............... F16H 47/04; F16H 61/42
[52] U.S. Cl. ........................... 477/52; 475/72; 60/487; 364/424.1
[58] Field of Search ............... 74/866; 364/424.1; 60/452, 487, 488; 475/83, 72

[56] References Cited

U.S. PATENT DOCUMENTS

| | | | |
|---|---|---|---|
| 3,901,031 | 8/1975 | Knapp et al. | 60/487 X |
| 4,261,229 | 4/1981 | Mizuno et al. | 74/866 |
| 5,214,983 | 6/1993 | Kobayashi et al. | 74/866 |

FOREIGN PATENT DOCUMENTS 58-142063 8/1983 Japan .
62-124354 6/1987 Japan .
62-292959 12/1987 Japan .
63-167171 7/1988 Japan .
6440757 2/1989 Japan .
1-277636 11/1989 Japan .

*Primary Examiner*—Leslie A. Braun
*Assistant Examiner*—Khoi Ta
*Attorney, Agent, or Firm*—Wegner, Cantor, Mueller & Player

[57] ABSTRACT

A continuously variable transmission for use in a vehicle which enables smooth starting of the vehicle with a good response. The transmission is intended to eliminate a particular phenomenon in both low-speed and high-speed vehicles provided with the transmission at the time of starting, that is, delay in response and subsequent abrupt rushing out of the vehicles. To this end, the transmission is provided with a variable speed hydraulic transmitting system connected to a hydraulic pump/motor of a variable displacement type acting as a pump and a hydraulic pump/motor of a variable displacement type acting as a motor, and to change the displacement of the hydraulic pump/motor acting as a pump, there are additionally provided a control cylinder, a servo valve, a circuit for detecting the differential pressure of the hydraulic transmitting system, a potentiometer and the like, and a duty control valve. A negative feedback control is performed on the piston by the duty control valve so that the effective differential pressure detected by the differential pressure detecting circuit is kept at a set pressure corresponding to the accelerator pedal position detected by an accelerator pedal position detector.

19 Claims, 13 Drawing Sheets

CONTINUOUSLY VARIABLE TRANSMISSION WITH CORRECTED DIFFERENTIAL PRESSURE IN A LOW SPEED MODE

FIELD OF THE ART

This invention relates to improvement in the starting characteristic of continuously variable transmissions of both the hydrostatic type adapted for a low to medium vehicle speed range and the hydro-mechanical type adapted for a low to high vehicle speed range.

BACKGROUND ART

In vehicles provided with a gasoline engine, it has been customary to determine the optimum engine speed for throttle position in view of improvement of fuel consumption and/or purification of exhaust gas. With a continuously variable transmission it is possible to run an engine at a desired speed regardless of the vehicle speed. To this end, it has been customary to control a continuously variable transmission by a speed-ratio controller so as to realize the above-mentioned desirable correspondence between throttle position and engine speed.

In particular, the conventional standard hydrostatic continuously variable transmission includes a variable speed hydraulic transmitting system between a pair of hydraulic pump/motors at least one of which at the input side is of a variable displacement type, and is so designed that the speed ratio of the output speed to the input speed can be rendered nearly zero with the displacement of the input hydraulic pump/motor acting as a pump being kept zero.

The conventional hydro-mechanical continuously variable transmission comprises: a differential mechanism having a first, a second and a third input/output terminal, a low-speed mechanical transmitting system between the first and second input/output terminals, and a high-speed mechanical transmitting system between the first and third input/output terminals; a hydraulic transmitting mechanism comprising a first hydraulic pump/motor of a variable displacement type the input/output shaft of which is connected to the second input/output terminal of the differential mechanism and a second hydraulic pump/motor of a variable displacement type the input/output shaft of which is connected to the third input/output terminal thereof thereby to form a variable speed hydraulic transmitting system; a low-speed clutch for connecting and disconnecting the transmitting terminal of the above-mentioned low-speed mechanical transmitting system to and from a rotary element provided at the output side; and a high-speed clutch for connecting and disconnecting the transmitting terminal of the above-mentioned high-speed mechanical transmitting system to and from another rotary element provided at the output side, whereby either a low-speed or a high-speed mode can be selected by operating either one of the above-mentioned clutches; the first input/output terminal being connected to an engine and the rotary elements, to an axle of the vehicle.

The speed-ratio controller that is composed chiefly of an ECU (electronic control unit) detects throttle position or accelerator pedal position and engine speed and controls the displacement of the hydraulic pump/motor so that the engine speed is kept at a desired value in accordance with the throttle position.

The above control will be described in detail. As the driver steps on the accelerator pedal, the throttle valve is opened, and the desired engine speed corresponding to the throttle position is obtained from a chart of throttle position/desired engine speed, and the displacement of the hydraulic pump/motor, that is, the speed ratio of the continuously variable transmission is controlled so as to keep the actual engine speed at the desired value.

The vehicle provided with the conventional continuously variable transmission has the following three problems:

First, a time delay exists between the time the accelerator pedal is stepped on to start the vehicle and the time the vehicle begins to start, with resulting deterioration of response. In particular, if the throttle position is subjected to a stepwise increase as the driver steps on the accelerator pedal, the desired engine speed SD greatly increases stepwise. The actual engine speed SE, however, increases with the first order lag accompanied with loss time, so that for some time the actual engine speed SE remains lower than the desired engine speed SD. It is only after the actual engine speed SE exceeds the desired engine speed SD that the engine begins to be loaded by increasing the displacement of the hydraulic pump/motor acting as a pump which has until then been zero so as to lower the actual engine speed SE. Consequently, hydraulic fluid begins to flow into the hydraulic pump/motor at the output side which acts as a motor, so that the vehicle starts moving. The above arrangement has a disadvantage that when the accelerator pedal has been stepped on, until the actual engine speed SE becomes high, the displacement of the hydraulic pump/motor acting as a pump remains unchanged and no hydraulic fluid is supplied to the hydraulic pump/motor acting as a motor, so that the vehicle does not move.

A second disadvantage is that there occurs a great overshooting of the actual engine speed SE. Even when the actual engine speed SE exceeds the desired engine speed SD and the speed-ratio controller begins to increase the displacement of the hydraulic pump/motor acting as a pump, the actual engine speed SE is not suppressed until the engine load torque due to the increasing displacement increases to exceed the engine output torque corresponding to the throttle position at that time, so that the actual engine speed SE continues to increase to cause an overshooting. For example, when the accelerator pedal is stepped on comparatively deeply as is usual with ordinary drivers, the throttle valve is greatly opened stepwise so that the engine output torque corresponding to the throttle position increases greatly. At that time, however, since the displacement of the hydraulic pump/motor acting as a pump remains small, the engine load torque remains small even when the high pressure side of the hydraulic transmitting system has reached a relief pressure, so that the actual engine speed SE rises over the desired engine speed SD so as to cause the relief valve to operate. In other words, while the vehicle speed remains low, the engine output torque is excessively great, so that with the relief valve open to cast away excessive energy, the engine is running almost under racing condition to cause an overshooting of the actual engine speed SE. As a result, it becomes impossible at least during that period of time to run the vehicle with low fuel consumption.

The third disadvantage is that when the vehicle is started, the pressure fluctuates greatly with resulting great fluctuation of the torque. After the actual engine speed SE has overshot in the above-mentioned manner, the speed-ratio controller rapidly increases the displacement of the hydraulic pump/motor acting as a pump in order to recover the delay in control, so that the flow of hydraulic fluid through the hydraulic transmitting system suddenly increases to cause the pressure and the torque to increase rapidly. This causes acceleration at the time of starting the vehicle to become excessive thereby to prevent the vehicle from starting smoothly and give the driver a feeling of rushing out.

The invention has been accomplished in view of the above-mentioned problems, and its object is to solve the above-mentioned first and third problems concerning the starting characteristic which is of primary importance in vehicles thereby to ensure stable, smooth driving and speed changing at the time of starting the vehicle, and to solve the above-mentioned second problem thereby to improve fuel consumption.

DISCLOSURE OF THE INVENTION

To attain the above objects, the invention has the following construction.

In the continuously variable transmission of the hydrostatic type, a variable speed hydraulic transmitting system is formed between a pair of hydraulic pump/motors at least one of which at the input side is of a variable displacement type, so that with the displacement of the input hydraulic pump/motor acting as a pump being kept zero, the speed ratio of the output speed to the input speed can be rendered nearly zero. The transmission is characterized by the provision of: displacement changing means for changing the displacement of the above-mentioned hydraulic pump/motors; detecting means for detecting the effective differential pressure in the above-mentioned hydraulic transmitting system; an accelerator pedal position detecting means; and displacement controlling means for performing negative feedback control on the above-mentioned displacement changing means so that the effective differential pressure detected by the above-mentioned effective differential pressure detecting means is kept at the set pressure corresponding to the accelerator pedal position detected by the above-mentioned accelerator pedal position detecting means.

With the above arrangement it is possible to eliminate the delay from the time the accelerator pedal is stepped on to the time the vehicle begins to move thereby to improve response and at the same time to prevent sudden rushing out of the vehicle. In particular, when the driver steps deep on the accelerator pedal to start the vehicle, before the engine speed rises, the displacement of the hydraulic pump/motor acting as a pump begins to be changed by the negative feedback control performed by the displacement controlling means so that the effective differential pressure may be kept at the set value corresponding to the accelerator pedal position. In particular, with the hydraulic pump/motor acting as a motor at the output side being kept stationary, first the displacement of the hydraulic pump/motor acting as a pump slightly increases to produce an effective differential pressure, whereupon the hydraulic pump/motor acting as a motor begins to rotate to draw in hydraulic fluid thereby to cause a drop in the effective differential pressure. To compensate for the pressure drop the displacement of the hydraulic pump/motor acting as a pump further increases. The operation is repeated, so that from the moment the accelerator pedal is stepped on the displacement of the hydraulic pump/motor acting as a pump increases as the vehicle speed increases. In this manner, the effective differential pressure is kept stable, so that the effective differential pressure is in proportion to the acceleration of the vehicle. Since in this control the effective differential pressure and consequently the acceleration is kept constant so long as the accelerator pedal position is kept constant, from the moment the accelerator pedal is stepped on a stable, effective traction force is obtained so that the vehicle begins to move. Of course, it is possible for the drive to adjust the acceleration to a desired value by changing the accelerator pedal position. Thus in accordance with the invention, it is possible to eliminate the time delay corresponding to the first order lag accompanied with loss time which existed until the engine speed rose in the prior art, thereby to improve response. Moreover, in this control it is not necessary to suddenly increase the displacement of the hydraulic pump/motor acting as a pump to recover delay in the control after the actual engine speed has risen as in the prior art arrangement, so that inadvertent rushing out of the vehicle can be prevented. Thus, the above arrangement makes it possible to stably and smoothly drive the vehicle and change the speed thereof.

The continuously variable transmission of the hydromechanical type comprises: a differential mechanism having a first, a second and a third input/output terminal, a low-speed mechanical transmitting system between the first and second input/output terminals, and a high-speed mechanical transmitting system between the first and third input/output terminals; a hydraulic transmitting mechanism comprising a hydraulic pump/motor of a variable displacement type the input/output shaft of which is connected to the second input/output terminal of the above differential mechanism and another hydraulic pump/motor of a variable displacement type the input/output shaft of which is connected to the above-mentioned third input/output terminal thereby to form a variable speed hydraulic transmitting system; a low-speed clutch for connecting and disconnecting the transmitting terminal of the above-mentioned low-speed mechanical transmitting system to and from a rotary element provided at the output side; and a high-speed clutch for connecting and disconnecting the transmitting terminal of the above-mentioned high-speed mechanical transmitting system to and from a rotary element provided at the output side; whereby either a low-speed mode or a high-speed mode can be selected by operating either one of the above-mentioned clutches.

The continuously variable transmission is characterized by the provision of: displacement changing means for changing the displacement of the above-mentioned hydraulic pump/motors; detecting means for detecting the effective differential pressure in the above-mentioned hydraulic transmitting system; accelerator pedal position detecting means; displacement controlling means for performing a negative feedback control on the displacement changing means of the hydraulic pump/motor acting as a pump in such a manner that at the above-mentioned low-speed mode the effective differential pressure detected by the above-mentioned differential pressure detecting means is kept at the set pressure corresponding to the accelerator pedal position detected by the above-mentioned accelerator pedal position detecting means; and set pressure correcting means for correcting, in the first region where the displacement of the above-mentioned hydraulic pump/motor acting as a pump is kept below its maximum value, the above-mentioned set pressure as a function of the displacement or the speed ratio in such a manner that the output torque is kept substantially constant in correspondence to the accelerator pedal position provided that the accelerator pedal position is constant, and in the second region where the displacement of the above-mentioned hydraulic pump/motor is maximum and the displacement of the other hydraulic pump/motor is kept below the maximum value, keeping the above-mentioned set pressure at the corrected value corresponding to the maximum value of the displacement of the above-mentioned pump/motor acting as a pump in the above-mentioned first region.

With the above arrangement, it is possible to eliminate the delay from the time the accelerator pedal is stepped on to the time the vehicle begins to move, thereby to improve response and at the same time prevent sudden rushing out of the vehicle. In particular, if the accelerator and the throttle valve were connected directly to each other, when the driver stepped deeply on the accelerator pedal, the throttle valve would be operated to change stepwise. Before the engine speed rises, however, the displacement of the hydraulic pump/motor acting as a pump begins to be changed by the negative feedback control performed by the displacement controlling means so that the effective differential pressure may be kept at the set value corresponding to the accelerator pedal position. In particular, with the hydraulic pump/motor at the output side which acts as a motor being kept stationary, first the displacement of the hydraulic pump/motor which acts as a pump slightly increases to produce an effective differential pressure, whereupon the hydraulic pump/motor acting as a motor begins to rotate to swallow hydraulic fluid thereby to cause a drop in the effective differential pressure. To compensate for the pressure drop the displacement of the hydraulic pump/motor acting as a pump further increases. The operation is repeated, so that from the moment the accelerator pedal is stepped on the displacement of the hydraulic pump/motor acting as a pump increases as the vehicle speed increases. In this case, since the output torque of the hydraulic transmitting system, that is, the acceleration is given as the product of the displacement and the effective differential pressure, from the moment the accelerator pedal is stepped on, a stable, effective traction force is obtained, so that the vehicle begins to move. This eliminates the time delay due to the first order lag accompanied with loss time which existed before the actual engine speed rose in the prior art thereby to improve response.

For some time after the vehicle has started, the set pressure of the displacement controlling means is corrected by the set pressure correcting means to gradually decrease. The reason for this is as follows: In the transmission of the hydromechanical type, immediately after the vehicle has started, most of the engine torque is transmitted through the hydraulic transmitting system and little of the torque is transmitted through the mechanical transmitting system due to the nature of the differential mechanism. As the vehicle speed increases, however, the amount of torque transmitted through the mechanical transmitting system gradually increases. Provided that the set pressure of the displacement controlling means is kept constant with a certain accelerator pedal position, the amount of torque transmitted through the mechanical transmitting system which is superimposed on the constant torque transmitted through the hydraulic transmitting system gradually increases, so that the acceleration increases as the vehicle speed increases. This will not be desirable in most cases.

With the arrangement of the present invention, it is possible to subtract from the torque transmitted through the hydraulic transmitting system an equivalent to the torque through the mechanical transmitting system which is superimposed thereon by reducing the set pressure of the hydraulic transmitting system. On the other hand, with this control it is not necessary to suddenly increase the displacement of the hydraulic pump/motor acting as a pump to recover delay in the control after the actual engine speed has risen as in the prior art arrangement, so that inadvertent rushing out of the vehicle can be prevented. Thus, the above arrangement makes it possible to stably and smoothly drive the vehicle and change the speed thereof.

The above hydraulic and hydro-mechanical transmissions improve the performance of changing the vehicle speed, but cannot realize an engine speed corresponding to a throttle position desirable in view of improvement of fuel consumption and/or purification of exhaust gas. In particular, throttle position, engine speed and engine load torque are closely related to each other, and to have throttle position and engine speed in a proper mutual relation means to have throttle position and engine load torque in a proper mutual relation. In the control described above, the engine torque loaded by the hydraulic transmitting system is nearly proportional to the product of the displacement of the hydraulic pump/motor acting as a pump and the effective differential pressure, and increases as a linear function of the displacement. Therefore, the engine load torque is small when the vehicle starts. In the hydro-mechanical type, too, the mechanical transmitting system allows little or no load to act on the input side due to the nature of the differential mechanism, so that the engine load torque is small when the vehicle starts. Under the condition, on the assumption that the accelerator and the throttle value are connected directly to each other, when the driver steps on the accelerator pedal with usual sense of driving, a high output torque appears one-sidedly in the engine from the start, and at first the engine is run to overshoot under little or no load thereon and then gradually slows down as the load torque increases, so that the engine goes out of the optimum driving condition.

Therefore, it is useful to provide displacement detecting means for detecting the displacement of the hydraulic pump/motor acting as a pump, calculating means for obtaining an engine load torque from the effective differential pressure of the hydraulic transmitting system and the displacement detected by the above-mentioned displacement detecting means, throttle position changing means for changing the throttle position, throttle position controlling means for performing a feed-forward control on the above-mentioned throttle position changing means in such a manner that the throttle has the optimum position corresponding to the engine load torque obtained by the above-mentioned calculating means.

With the continuously variable transmission of the hydrostatic type provided with the above added means, it is possible to obtain an engine load torque by the calculating means and conduct a feed-forward control on the throttle valve by the throttle position controlling means to adjust the throttle valve to an optimum position, and consequently to make the above-mentioned driving and speed changing control the more proper and at the same time to prevent production of excess energy and realize low fuel consumption and/or low exhaust gas. In the continuously variable transmission of the hydro-mechanical transmission, too, since the operation of the mechanical transmitting system is negligible when the vehicle starts, the same operation and effects as the hydrostatic type can be expected.

The invention includes the following embodiments.

The embodiment in which the throttle position changing means comprises a front wire portion one end of which is connected to an accelerator, a rear wire portion one end of which is connected to a throttle valve and an acceleration modulator composed of a differential gear interposed between the front and rear wire portions and so designed as to divide the amount of operation on the accelerator pedal and apply the divided parts to the throttle valve and a variable fixing device capable of changing a fixed position; and the throttle position controlling means comprises an electronic control unit for applying a control signal to an actuator for operating the above-mentioned variable fixing device.

The embodiment in which the throttle position changing means comprises a main throttle valve one end of which is connected to an accelerator and a subsidiary throttle valve connected in series with the above-mentioned main throttle valve; and the throttle position controlling means comprises an electronic control unit for producing a control signal to be applied to an actuator for operating the above-mentioned subsidiary throttle valve.

The embodiment in which the displacement changing means comprises a hydraulic control cylinder; and the displacement controlling means comprises a servo valve for introducing and discharging hydraulic fluid of a predetermined pressure into and out of the above-mentioned hydraulic control cylinder, a piston on the opposite sides of which a pilot pressure and an effective differential pressure act, an electronic control unit for producing a set pressure signal corresponding to the accelerator pedal position, and a duty control valve connected to the hydraulic pump/motor acting as a pump to produce a pilot pressure in accordance with the above-mentioned set pressure signal, the above-mentioned piston, servo valve and duty control valve constituting a pressure compensator.

The embodiment in which the displacement changing means comprises a hydraulic control cylinder; and the displacement controlling means comprises an electro-hydraulic servo valve for introducing and discharging hydraulic fluid of a predetermined pressure into and out of the above-mentioned hydraulic control cylinder, an electronic control unit for producing a set voltage corresponding to the accelerator pedal position, and a comparing circuit for producing a differential voltage between the set voltage produced by the electronic control unit and a voltage proportional to the effective differential pressure detected by a differential pressure detecting circuit as the effective differential pressure detecting means so as to be applied to said electro-hydraulic servo valve.

The embodiment in which the displacement changing means comprises a hydraulic control cylinder; and the displacement controlling means comprises a servo valve for introducing and discharging hydraulic fluid of a predetermined pressure into and out of the above-mentioned hydraulic control cylinder, a piston on one side of which an effective differential pressure acts, an electronic control unit for producing a set pressure signal corresponding to the accelerator pedal position, a relief valve for reducing the effective differential pressure acting on the above-mentioned piston when the effective differential pressure acting on the piston has reached the set pressure corresponding to the set pressure signal produced by the above-mentioned electronic control unit.

The embodiment in which the displacement changing means comprises a servo mechanism using a stepping motor.

The embodiment in which the displacement changing means is provided with an overspeed governor.

BRIEF DESCRIPTION OF THE DRAWINGS

FIG. 1 is a circuit diagram;

FIG. 2 is a graph showing a relation between speed ratio and displacement in a continuously variable transmission;

FIG. 3 is a graph showing a relation between accelerator pedal position and set pressure;

FIG. 4 is a graph showing a relation between speed ratio and traction force;

FIG. 5 is a graph showing a relation between speed ratio and engine load torque;

FIG. 6 is a graph showing a relation between engine speed and engine load torque;

FIG. 7 is a schematic illustration of a pressure compensator; and

FIGS. 8, 9 and 10 schematically show an acceleration modulator.

FIG. 11 is a circuit diagram;

FIG. 12 is a graph showing a relation between speed ratio and displacement in a continuously variable transmission;

FIG. 13 is a graph showing a relation between accelerator pedal position and set pressure;

FIG. 14 is a graph showing a relation between speed ratio and traction force;

FIG. 15 is a graph showing a relation between vehicle speed and traction force;

FIG. 16 is a graph showing a relation between engine speed and engine load torque; and FIG. 17 is a graph showing a relation between throttle position and desired engine speed in ordinary control.

BEST MODE FOR EMBODYING THE INVENTION

Figure 1:
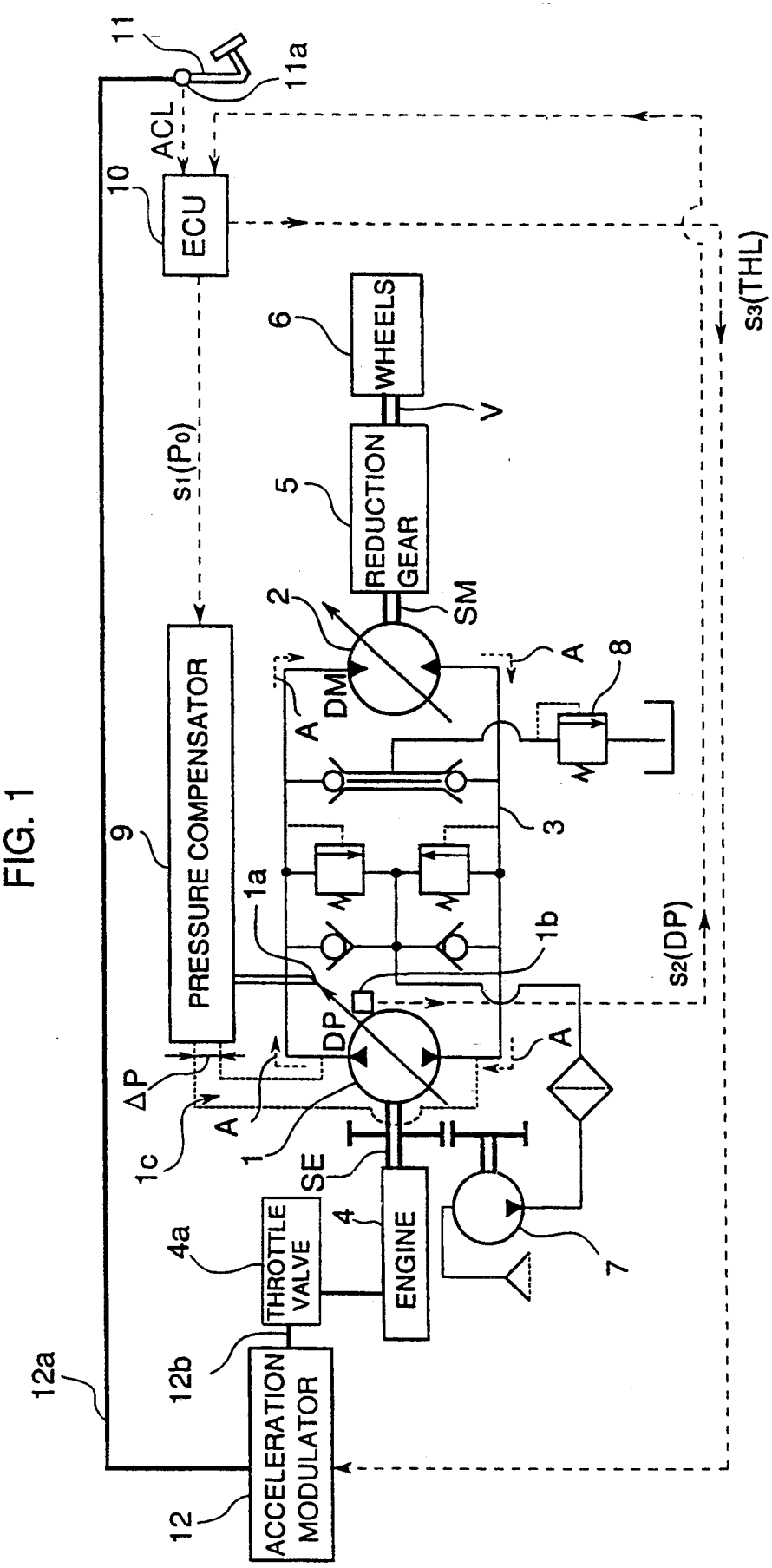
FIGS. 1 through 10 shows a first embodiment of the invention.

One embodiment of the invention will be described with reference of FIGS. 1 through 10.

The continuously variable transmission for use in a motor vehicle is a hydrostatic transmission commonly referred to as an HST and comprises a pair of hydraulic pump/motors of a variable displacement type 1 and 2 and a hydraulic circuit connecting them to form a variable speed hydraulic transmission system A. The hydraulic pump/motors 1 and 2 can advantageously be of a hydrostatic type in which the displacement is changed by changing the eccentricity of a pintle such as the one disclosed in Japanese Patent Application No. 56-175190 (Japanese Patent Publication No. 1-8190; U.S. Pat. No. 4,813,340). A gasoline engine 4 is connected to the hydraulic pump/motor 1 connected to the input of the transmission system and acting as a pump. (The hydraulic pump/motor 1 will be referred to as the hydraulic pump hereinafter). Wheels 6 are connected through a reduction gear 5 to the hydraulic pump/motor 2 connected to the output of the transmission system and acting as a motor. (The hydraulic pump/motor 2 will be referred to as the hydraulic motor 2 hereinafter). The maximum value DPmax of the displacement DP of the hydraulic pump 1 is set to a level equal to the maximum value DMmax of the displacement DM of the hydraulic motor 2. The transmission system A is backed up by a booster pump 7 and protected by a relief valve 8 against damage by pressure.

Figure 2:
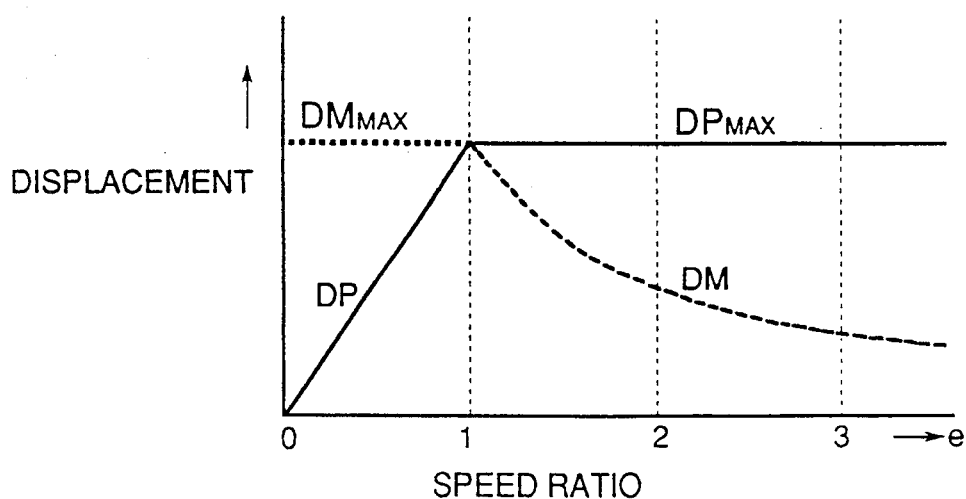
Figure 3:
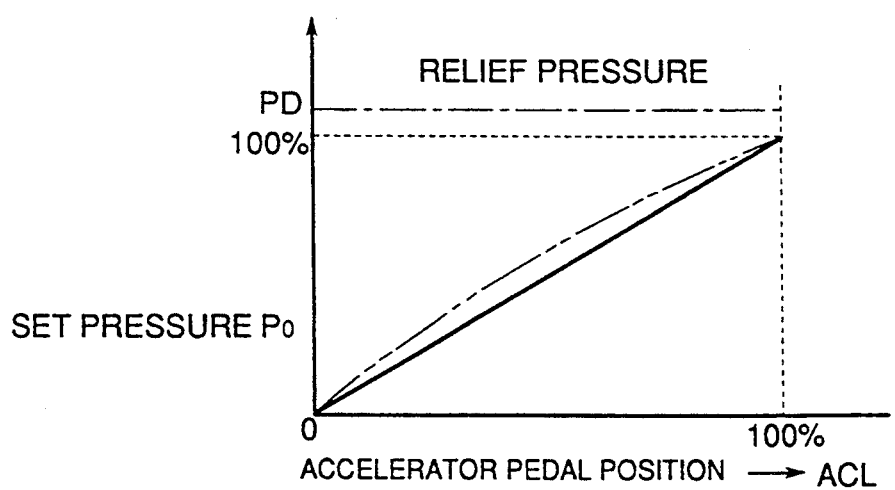

In the above continuously variable transmission, if the speed of the engine 4 is SE and the speed of the hydraulic motor 2, which is proportional to the vehicle speed V, is SM, the speed ratio e can be expressed as SM/SE. As shown in FIG. 2, the speed ratio e can be changed within the range of $0 < e \leq 1$ by changing the displacement DP of the hydraulic pump 1 from 0 to DP max with the displacement DM of the hydraulic motor 2 initially kept at the maximum value DMmax, and also in the range of $1 < e$ by decreasing the displacement DM of the hydraulic motor 2 from DMmax to 0 with the displacement DP of the hydraulic pump 1 kept at the maximum value DPmax.

A pressure compensator 9 is connected to the operating terminal $1a$ for changing the displacement of the hydraulic pump 1. An acceleration modulator 12 as a means for changing the position of a throttle valve $4a$ of the engine 4 is connected to an accelerator 11 by a wire $12a$ on one hand and to the throttle valve $4a$ by another wire $12b$ on the other hand. The pressure compensator 9 and the acceleration modulator 12 are controlled by an electronic control unit (to be referred to as the ECU hereinafter) 10 as a means for controlling the throttle position.

The function to be performed by the pressure compensator 9 is as follows: When the ECU 10 receives an amount ACL of operation applied to the accelerator pedal to produce a signal $S_1$ for setting a corresponding pressure $P_0$, the compensator 9 changes the displacement DP of the hydraulic pump 1 so that the effective differential pressure $\Delta P$, which a differential pressure detector $1c$ attached to the pump 1 as a means for detecting the effective differential pressure detects between the intake and outlet pressures of the pump 1, becomes equal to the set pressure $P_0$. In the illustrated embodiment, the pressure $P_0$ is so set as to be proportional to the amount ACl of operation applied to the accelerator pedal as shown by solid line in FIG. 3.

Figure 7:
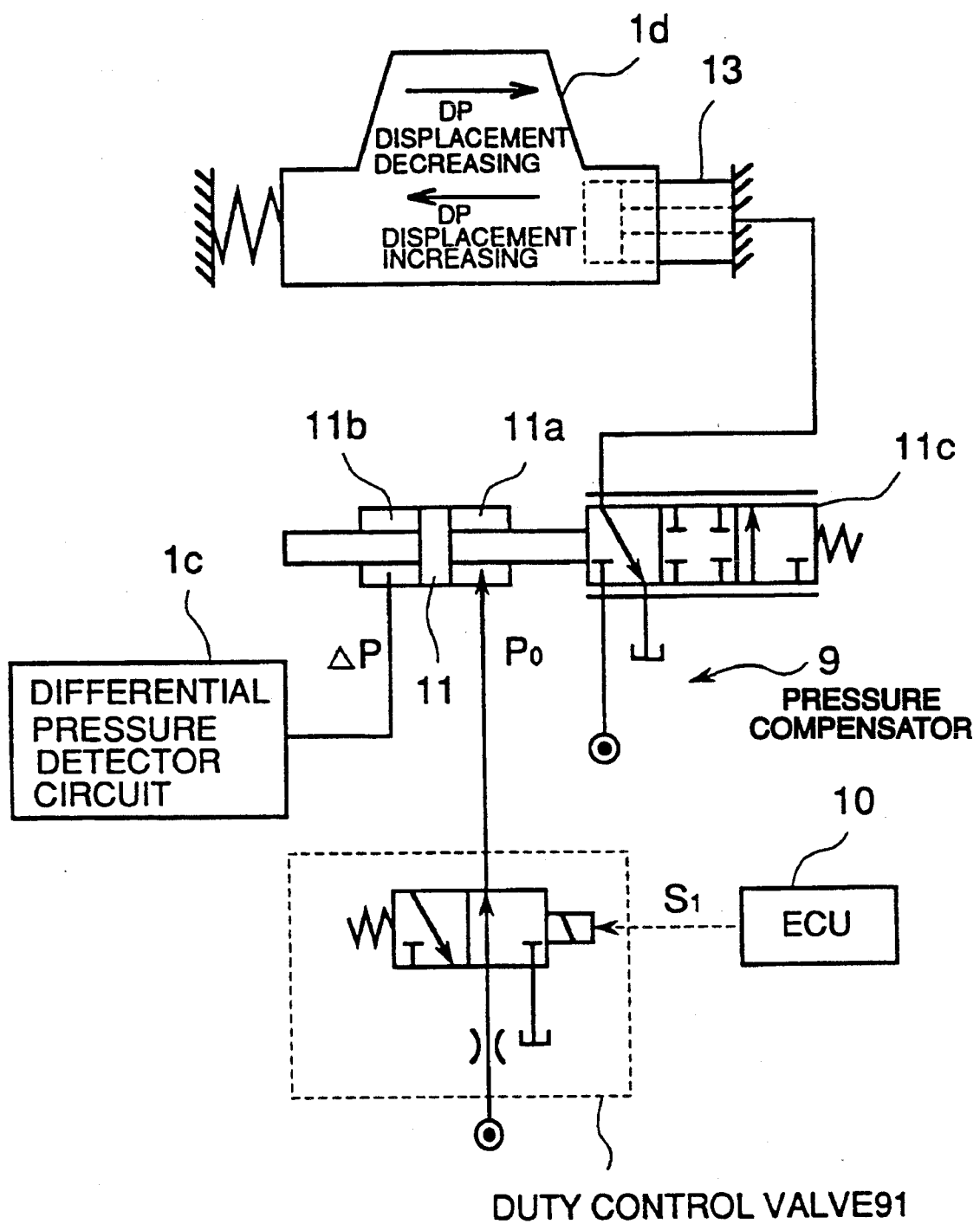
Figure 8:
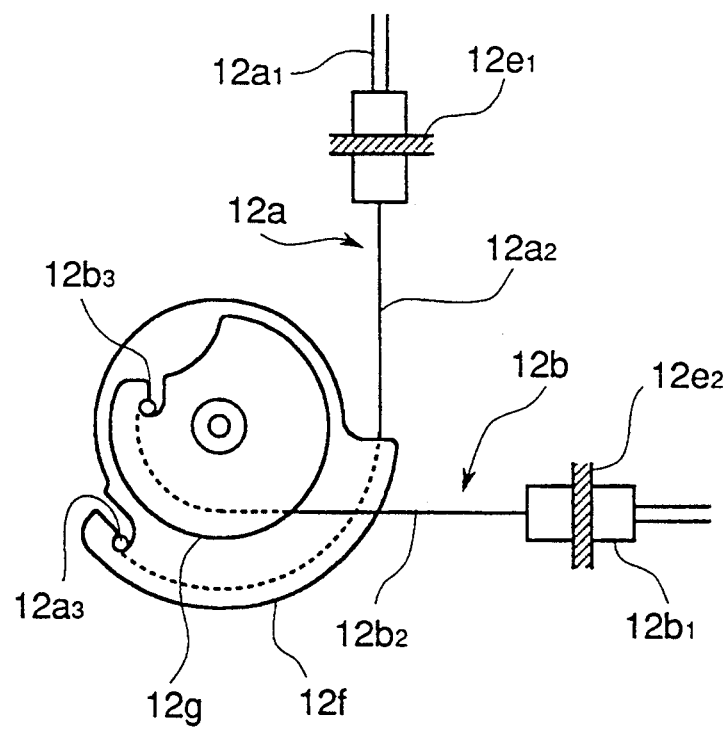
Figure 9:
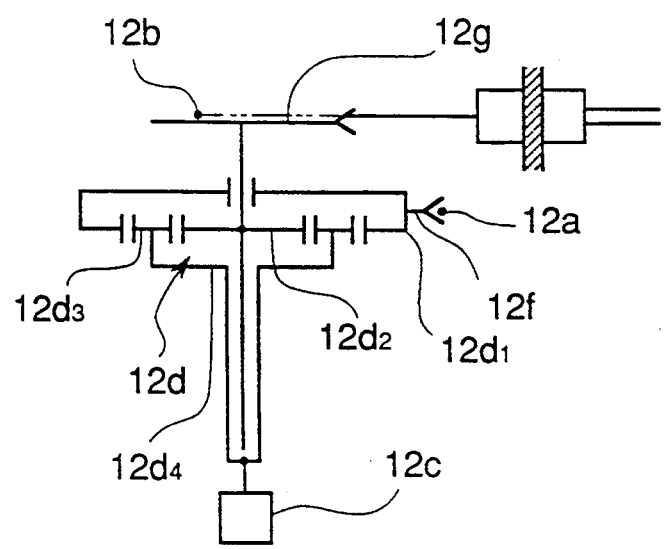
Figure 10:
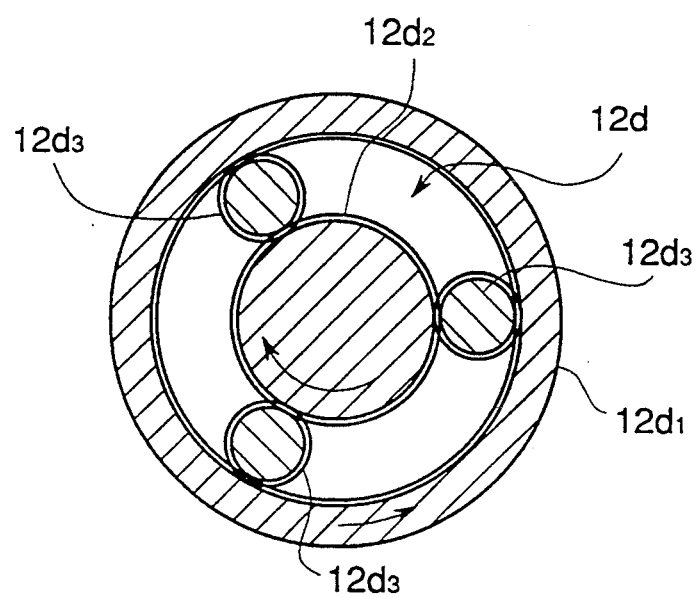
Figure 11:
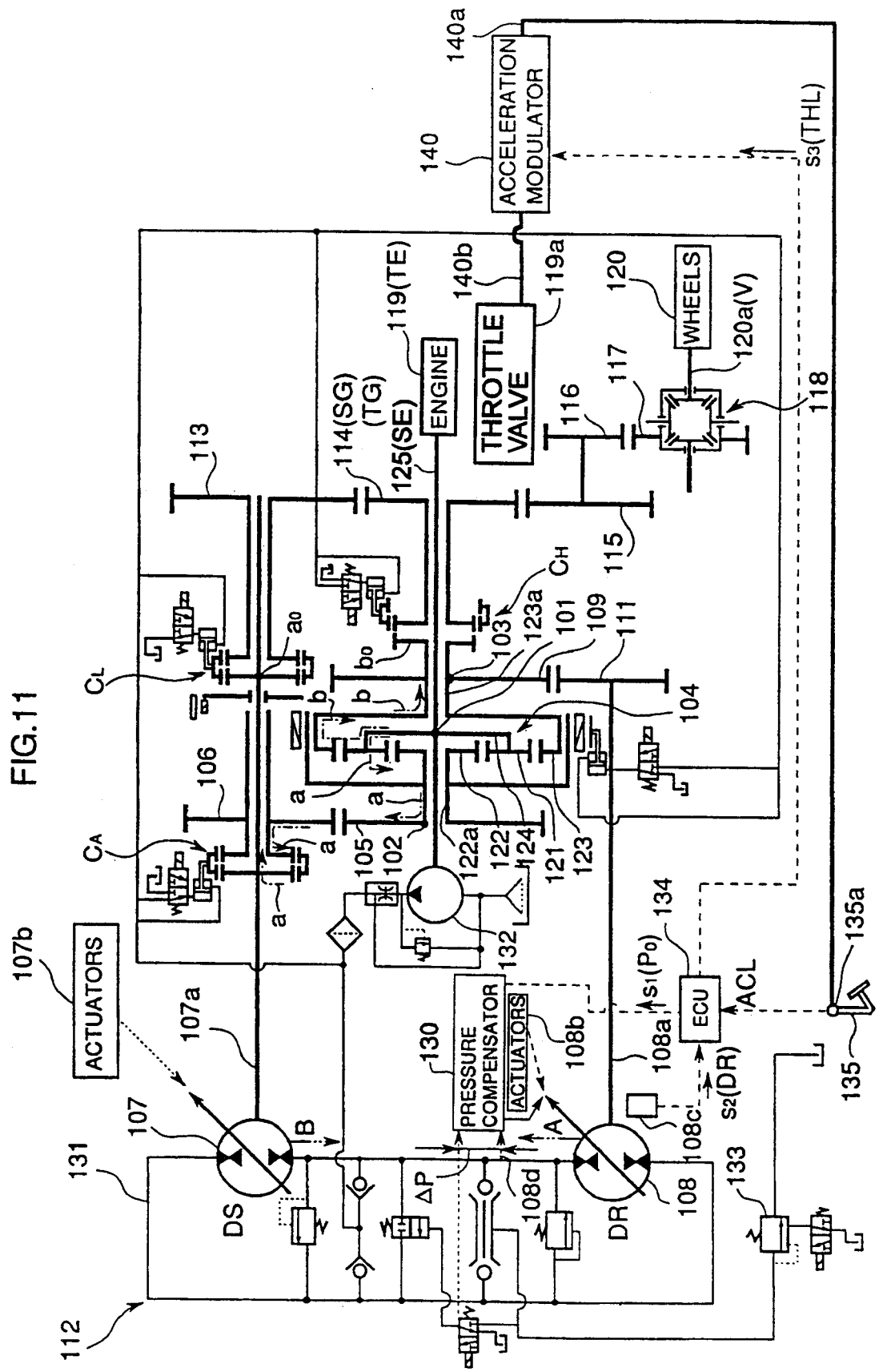
FIGS. 11 through 17 show a second embodiment of the invention.
Figure 12:
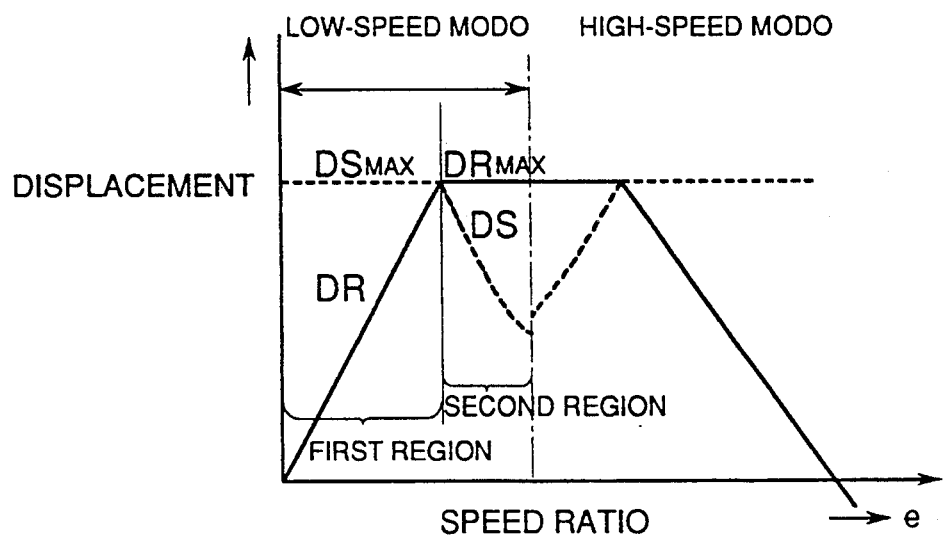

As schematically shown in FIG. 7, the pressure compensator 9 comprises a piston 11 as a component of a displacement controlling means, a servo valve $11c$ and a duty control valve 91. In particular, the duty control valve 91 is connected to the hydraulic pump 1 and so constructed that when the ECU 10 applies a set pressure signal $S_1$ proportional to the amount ACL of operation applied to the accelerator pedal, the valve 91 produces a set pressure $P_0$. With the pressure $P_0$ acting on one side $11a$ of the piston 11. to the other side $11b$ of which the actual effective differential pressure $\Delta P$ detected by the differential pressure detector $1c$ is applied to counteract the pressure $P_0$, if the effective differential pressure $\Delta P$ is smaller than the set pressure $P_0$, the piston 11 is moved to the left in the drawing, so that such an amount of hydraulic fluid as to increase the displacement DP is supplied from a high-pressure source to a control cylinder 13 for driving the pintle $1d$ through the servo valve $11c$. On the contrary, if the effective differential pressure $\Delta P$ is greater than the set pressure $P_0$, the piston 11 is moved to the right in the drawing, so that such an amount of hydraulic fluid as to decrease the displacement DP is discharged from the control cylinder 13 into a tank through the servo valve $11c$. In this manner, the effective differential pressure can be kept at the set value $P_0$.

The acceleration modulator disclosed in Japanese Patent Application No. 61-136968 (Japanese Unexamined Patent Publication No. 62-292959) can be used as the acceleration modulator 12. As schematically shown in FIGS. 1 and 8 to 10, the modulator 12 is provided between the front and rear portions $12a$ and $12b$ of a wire connecting the accelerator 11 and the throttle valve $4a$, and includes a differential gear mechanism of a planetary gear type $12d$ for dividing the amount ACL of operation applied to the accelerator pedal and applying the divided amounts to the throttle valve $4a$ and a variable fixing device $12c$ for changing a fixed position.

With a wire tube $12a_1$ having its rear end supported by a side wall $12e_1$ of a casing enclosing the differential gear mechanism $12d$, the forward wire portion $12a$ is introduced through the wire tube $12a_1$ into the casing as shown at $12a_2$ to extend along the periphery of an input pulley $12f$ fixed to the ring gear $12d_1$ of the differential gear mechanism $12d$ and has its rear end $12a_3$ engaged with a recess formed on the input pulley $12f$.

With a wire tube $12b_1$ having its forward end supported by another side wall $12e_2$ of the casing perpendicular to the above-mentioned side wall $12e_1$ thereof, the rear wire portion $12b$ is introduced through the wire tube $12b_1$ into the casing as shown at $12b_2$ to extend along the periphery of an output pulley $12g$ fixed to the sun gear $12d_2$ of the above-mentioned differential gear mechanism $12d$ and has its rear end $12b_3$ engaged with a recess formed on the output pulley $12g$.

The variable fixing device $12c$ is connected to the lower end of a gear retainer $12d_4$ supporting planetary gears $12d_3$. The device may comprise a rack and pinion mechanism, a rotary actuator or the like, and has a function to rotate the above-mentioned gear retainer $12d_4$ for a rotational angle corresponding to a signal from outside and exert a force on the gear retainer $12d_4$ at that position thereby to fix the same there. In particular, when the fixing device $12c$ fixes the gear retainer $12d_4$ at a certain position, the planetary gears $12d_3$ do not rotate about the sun gear $12d_2$ but the rotation of the ring gear $12d_1$ in one direction causes the sun gear $12d_2$ to rotate about its axis in a direction opposite to that of the ring gear $12d_2$ as shown by arrows in FIG. 10. As a result, the forward and rear wire portions $12a$ and $12b$ are moved in ganged relation with the accelerator 11 apparently as if they were connected directly to each other.

With the accelerator 11 kept at a certain operative position, when the fixing mechanism $12c$ is operated to change the fixed position of the gear retainer $12d_4$, the ring gear $12d_1$ does not rotate around the sun gear $12d_2$ but the planetary gears $12d_3$ move around the sun gear $12d_2$ thereby to cause the sun gear to rotate on its axis in the opposite direction. This makes it possible to move the rear wire portion 12b independently in an increasing or decreasing direction despite the accelerator 11 and the forward wire portion 12a being held stationary.

In order to adapt the hydraulic pump 1 to the optimum driving condition the pump 1 is provided with an eccentricity sensor 1b as a means for detecting the displacement of the pump 1. The previously mentioned ECU 10, which functions as a calculator, multiplies the displacement DP detected as a detection signal $S_2$ by the previously mentioned set pressure (or the effective differential pressure) Po to obtain the engine load torque TE (cf. FIGS. 3 and 5).

Figure 6:
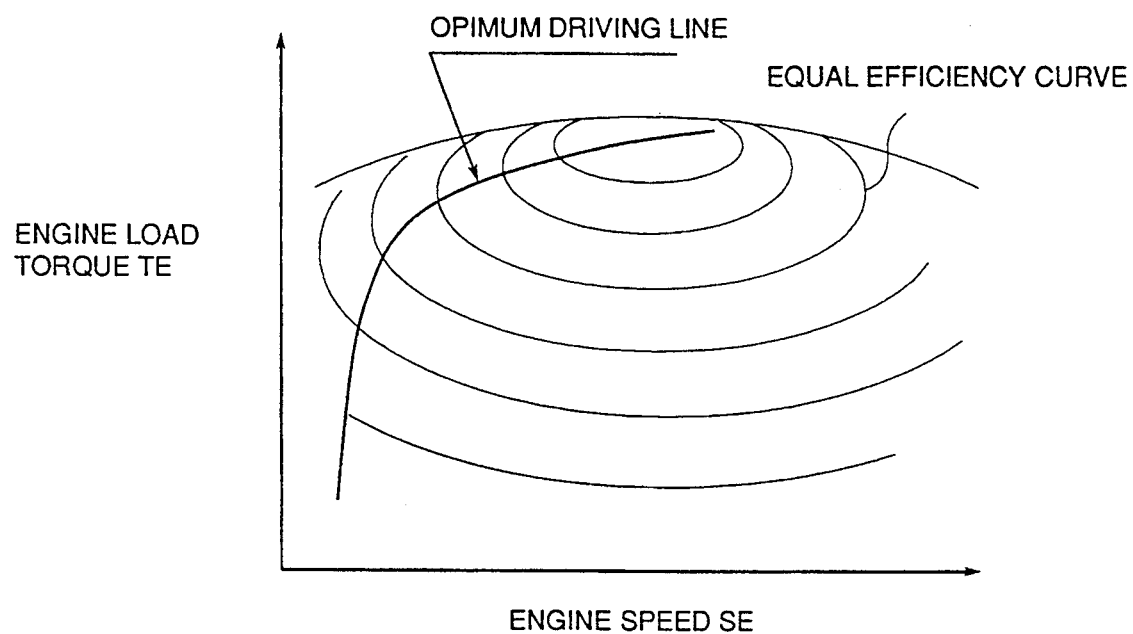

The throttle position THL supposed to be optimal for the engine load torque TE in view of improvement of fuel consumption and purification of exhaust gas is stored in the ECU 10 beforehand. The throttle position THL is given as a value corresponding to the operating point which is determined by the engine load torque TE and the engine speed SE on the optimum driving line as shown in FIG. 6. In order to effect such a throttle position as mentioned above, the ECU 10 applies a control signal $S_3$ to the fixing mechanism 12c of the acceleration modulator 12 thereby to perform a successive feed-forward control on the throttle valve 4a.

Figure 4:
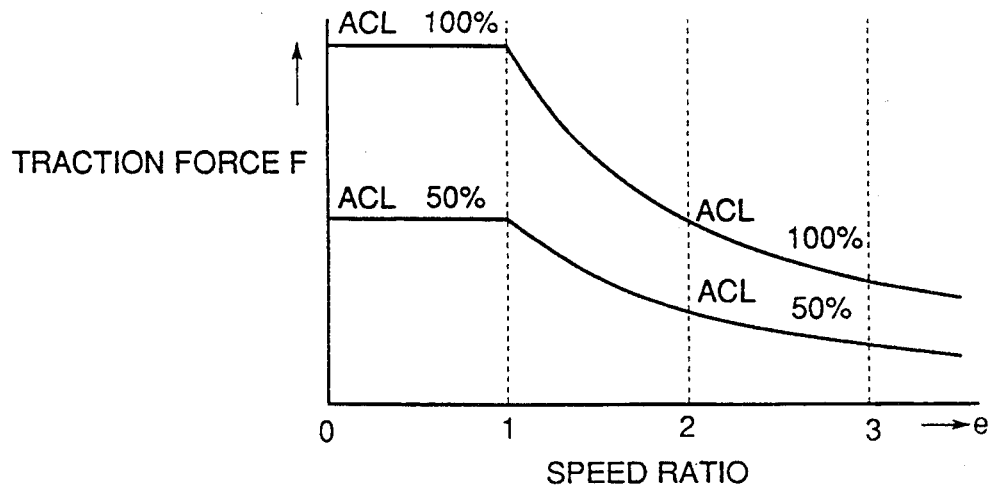
Figure 5:
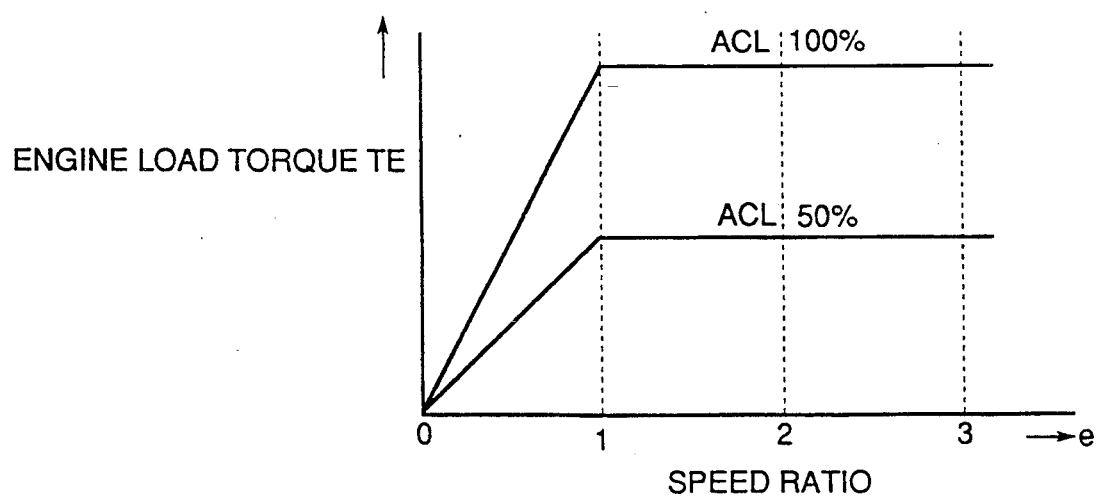

With the above arrangement and operation it is possible to improve the starting characteristic of a vehicle provided with a continuously variable transmission and at the same time improve fuel consumption. In particular, when the driver steps on the accelerator pedal 11 to start the vehicle, the acceleration modulator 12 causes the throttle valve 4a to be opened to the optimum position thereby to supply an optimum amount of fuel to the engine. Simultaneously with the above operation, the displacement DP of the hydraulic pump 1 is changed by negative feedback control before the engine speed SE increases, so that the effective differential pressure $\Delta P$ (=Po) proportional to the amount ACL of operation applied to the accelerator pedal is maintained. In particular, with the hydraulic motor 2 remaining stationary, initially the displacement DP of the hydraulic pump 1 slightly increases to produce an effective differential pressure Po, whereupon the hydraulic motor 2 begins to rotate to swallow hydraulic fluid thereby to reduce the differential pressure Po. In order to compensate for the reduction of the differential pressure, the displacement DP of the hydraulic pump 1 increases. The operation continues, so that from the moment the accelerator pedal 11 is stepped on the displacement DP of the hydraulic pump 1 increases as the vehicle speed V increases. In this manner, the effective differential pressure Po is kept stable in proportion to the acceleration of the vehicle. Since in this control the differential pressure Po is constant, that is, the acceleration becomes constant so long as the accelerator 11 is kept constant, a constant, effective traction force F is obtained from the first as shown in FIG. 4, so that the moment the accelerator pedal is stepped on, the vehicle begins to move. By changing the degree of operation applied to the accelerator pedal the driver can of course adjust the acceleration to an intended level.

Thus, the continuously variable transmission of this embodiment can eliminate the time delay corresponding to the first order lag accompanied with loss time which existed before the engine speed SE rose in the prior art thereby to improve the response of the engine. In this control it is not necessary to suddenly increase the displacement DP of the hydraulic pump 1, as in the conventional control, to recover delay in the control after the engine speed SE has risen, so that no feeling of rushing out is experienced when the vehicle starts. With the continuously variable transmission of the invention it is possible to drive the vehicle and change its speed stably and smoothly. In the continuously variable transmission, since the throttle position THL is always adjusted by feed-forward control to an optimum value in accordance with the driving condition shown in FIG. 6, it is possible to optimize the control of the engine 4 without overshooting the engine under little or no load condition when the vehicle starts, thereby to prevent production of excess energy and to realize low fuel consumption and/or low exhaust gas condition.

A second embodiment of the invention will be described with reference to FIGS. 11 to 17.

The continuously variable transmission is commonly referred to as the HMT (hydro-mechanical transmission) and comprises: a differential mechanism 104 provided with a first, a second and a third input/output terminal 101, 102 and 103, a low-speed mechanical transmitting system a between the first and second input/output terminals 101 and 102, and a high-speed mechanical transmitting system b between the first and third input/output terminals 101 and 103; a hydraulic transmitting mechanism 112 comprising a hydraulic pump/motor of a variable displacement type 107 the input/output shaft 107a of which is connected through gears 105 and 106 to the second input/output terminal 102 of the above differential mechanism 104 and another hydraulic pump/motor of a variable displacement type 108 the input/output shaft 108a of which is connected through gears 109 and 111 to the above-mentioned third input/output terminal 103 thereby to form variable speed transmitting systems A and B; a low-speed clutch $C_L$ for connecting and disconnecting the transmitting end $a_o$ of the above-mentioned low-speed mechanical transmitting system a to and from a gear 113 provided as a rotary element at the output side; and a high-speed clutch $C_H$ for connecting and disconnecting the transmitting end $b_o$ of the above-mentioned high-speed mechanical transmitting system b to and from a gear 114 provided as a rotary element at the output side.

In particular, the differential mechanism 104 is of a planetary gear type comprising a plurality of planetary gears 121 arranged circumferentially and at an equal angular distance from each other, a sun gear 122 disposed inside and a ring gear 123 disposed outside, both meshing with the planetary gears. The center of a gear retainer 124 supporting the planetary gears 121 is made the above-mentioned first input/output terminal 101, to which an engine 119 is connected through an input/output shaft 125. The outer end of the supporting shaft 122a of the above-mentioned sun gear 122 is made the above-mentioned second input/output terminal 102, to which the gear 105 is fixed. The outer end of the boss 123a of the above-mentioned ring gear 123 is made the above-mentioned third input/output terminal 103, to which the gear 109 is fixed. Thus, the above-mentioned low-speed mechanical transmitting system a is composed of the above-mentioned planetary gears 121, sun gear 122, gears 105 and 106 and clutch $C_A$, and terminates in the transmitting end $a_o$ on the input/output shaft 107a of the above-mentioned hydraulic pump/motor 107. The above-mentioned high-speed mechanical transmitting system b is composed of the above-mentioned planetary gears 121 and ring gear 123, and terminates in the transmitting end $b_o$ on the boss 123a of the ring gear 123.

The above-mentioned hydraulic transmitting mechanism 112 comprises a series combination of the hydraulic pump/motors 107 and 108 through a hydraulic circuit 131 as in the conventional HST, with the input/output shaft 107a of the hydraulic pump/motor 107 being connected to the supporting shaft 122a of the above-mentioned sun gear 122 through the gears 106 and 105, and the input/output shaft 108a of the above-mentioned hydraulic pump/motor 108 being connected to the boss 123a of the above-mentioned ring gear 123 through the gears 111 and 109. A booster pump 132 is connected to the above-mentioned hydraulic circuit 131, and a safety valve 133 is provided to protect the hydraulic circuit 131 against damage by pressure. As in the previous embodiment, the hydraulic pump/motors 107 and 108 are preferably of the hydrostatic type in which displacement is changed by changing the eccentricity of the pintle by actuators 107b and 108b acting on the operating ends thereof.

The previously described gears 113 and 114 as the output rotary elements mesh with each other, and are connected to wheels 120 through gears 115, 116 and 117, a differential gear mechanism 118 and an axle 120a.

The general operation of the continuously variable transmission will now be described. As shown in the drawing, in the forward, low-speed driving mode in which the clutches $C_A$ and $C_L$ are thrown in and the clutch $C_H$ is released, part of the motive power transmitted from the engine 119 through the low-speed mechanical transmitting system a connecting the first and second input/output terminals 101 and 102 of the above-mentioned differential mechanism 104 is transmitted to the wheels 120. At this time the above-mentioned hydraulic pump/motor 107 functions as a motor and the hydraulic pump/motor 108, as a pump, so that the rotational force at the third input/output terminal 103 of the previously mentioned differential mechanism 104 is parallelly transmitted to the above-mentioned wheels 120 through the hydraulic transmitting system A formed between both the above-mentioned pump/motors 107 and 108. In this low-speed mode, by increasing the displacement DR of the hydraulic pump/motor 108 with the displacement DS of the hydraulic pump/motor 107 being intitially kept at the maximum value $DS_{max}$ as in the first region in FIG. 12 and, after the displacement DR has reached the maximum value DRmax, gradually decreasing the displacement DS of the previously mentioned hydraulic pump/motor 107 with the displacement DR being kept at the maximum value as in the second region, the ratio SG/SE of the rotational speed SG of the previously mentioned output gear 114 to the rotational speed SE of the previously mentioned input shaft 125, that is, the speed ratio e can be increased. By throwing the clutches $C_A$ and $C_H$ in and releasing the clutch $C_L$ it is possible to change from the forward, low-speed mode to the forward, high-speed mode. Details of the forward, high-speed mode are described in, for example, Japanese Patent Application No. 62-193500 (Japanese Unexamined Patent Publication No. 64-40758).

In the apparatus of this embodiment, beside the above-mentioned actuator 108b a pressure compensator 130 is provided at the operating terminal for changing the displacement of the above-mentioned hydraulic pump/motor 108, and the throttle valve 119a of the engine 119 is connected to the accelerator 135 by separate wires 140a and 140b with an acceleration modulator 140 interposed therebetween as a means for changing the throttle position, so that the pressure compensator 130 and the acceleration modulator 140 may be controlled by an electronic control unit (ECU) 134 as a means for controlling the throttle position.

Figure 13:
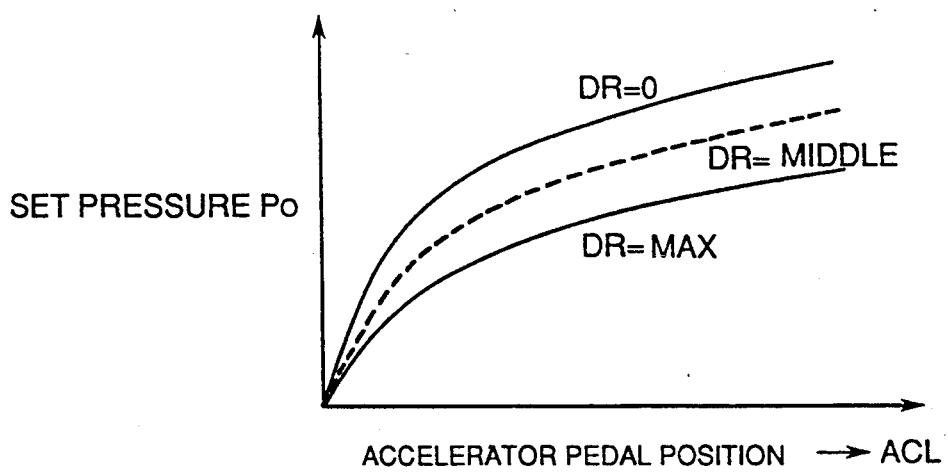

The pressure compensator 130 serves as a means for correcting the set pressure in the apparatus of the invention, and operates in the low-speed mode to maintain the effective differential pressure $\Delta P$ between the intake and outlet pressures detected by the differential pressure detector 108d attached as an effective differential pressure detecting means to the above-mentioned hydraulic pump/motor 108, at the set pressure Po through negative feedback control of the displacement DR of the pump/motor 108. In the first region the set pressure Po is determined as shown in FIG. 13 in relation to the amount ACL of operation on the accelerator as detected by an accelerator pedal position detector 135a such as an encoder or a potentiometer, and corrected in relation to the displacement DR. In particular, in principle the set pressure Po increases in proportion to the amount ACL of operation on the accelerator pedal, and is shifted to decrease as the displacement DR is changed so as to increase with a constant amount ACL of operation on the accelerator pedal. In the second region the set pressure Po is determined on the curve DR=MAX in FIG. 13, so that a constant power is resulted from a constant amount ACL of operation on the accelerator.

In this embodiment, the pressure compensator 130 can be of the same type as the pressure compensator 9 used in the previous embodiment (FIG. 7), so that no description of the construction thereof will be given.

The acceleration modulator 140 in this embodiment can also be of the same type as the acceleration modulator in the previous embodiment (cf. FIGS. 8 to 10) and is interposed between the forward and rear portions 140a and 140b of a wire connecting the accelerator 135 and the throttle valve 119a. Usually the rear wire portion 140b is displaced in ganged relation to the forward wire portion 140a, and can be displaced independently in response to an input signal from outside.

In order to attain an optimum driving condition the above-mentioned hydraulic pump/motor 108 is provided with an eccentricity sensor 108c as a displacement detecting means. The previously mentioned ECU 134, which functions also as a calculator, multiplies the displacement DR detected as a detection signal $S_2$ by the previously mentioned set pressure (or the effective differential pressure) $P_0$ to obtain the engine load torque TE. The throttle position THL supposed to be optimum for the engine load torque TE in view of improvement of fuel consumption and purification of exhaust gas is stored in the ECU 134 beforehand. The throttle position THL is a parameter for drawing an optimum driving line in FIG. 16 and is determined primarily by the engine speed SE and the engine load torque TE. In order to effect such a throttle position as mentioned above, the above-mentioned ECU 134 applies an output signal $S_3$ to the above-mentioned acceleration modulator 140 thereby to perform a successive feed-forward control on the throttle valve 119a.

Figure 14:
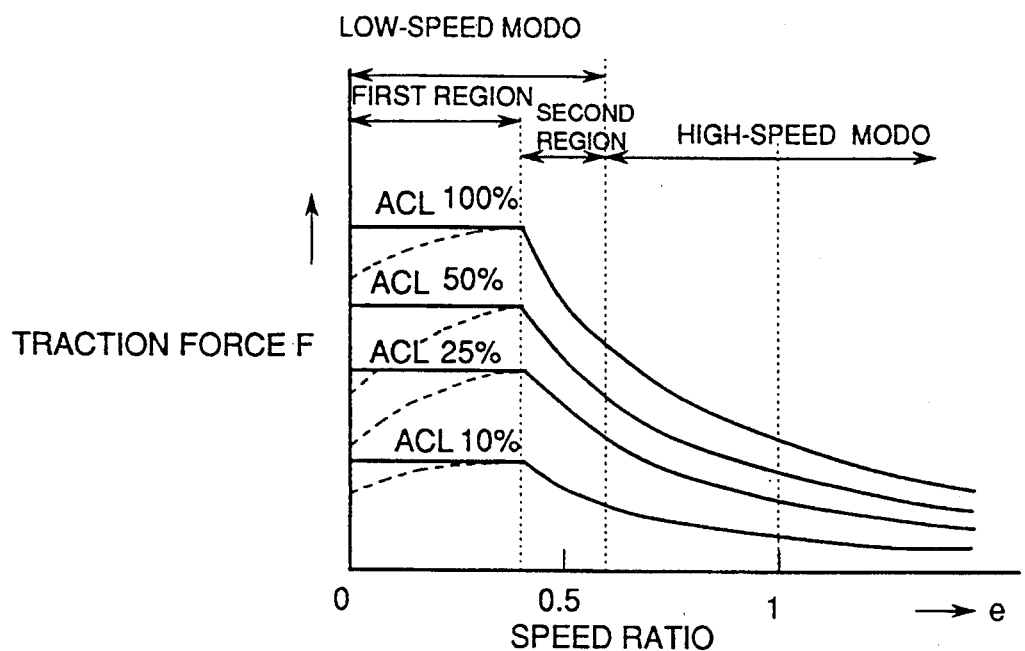
Figure 15:
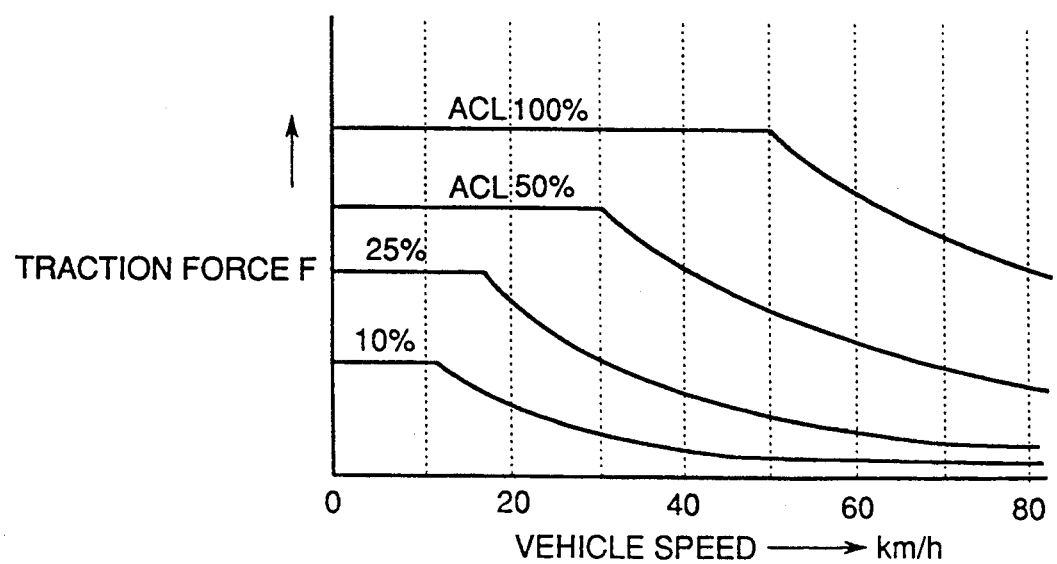
Figure 16:
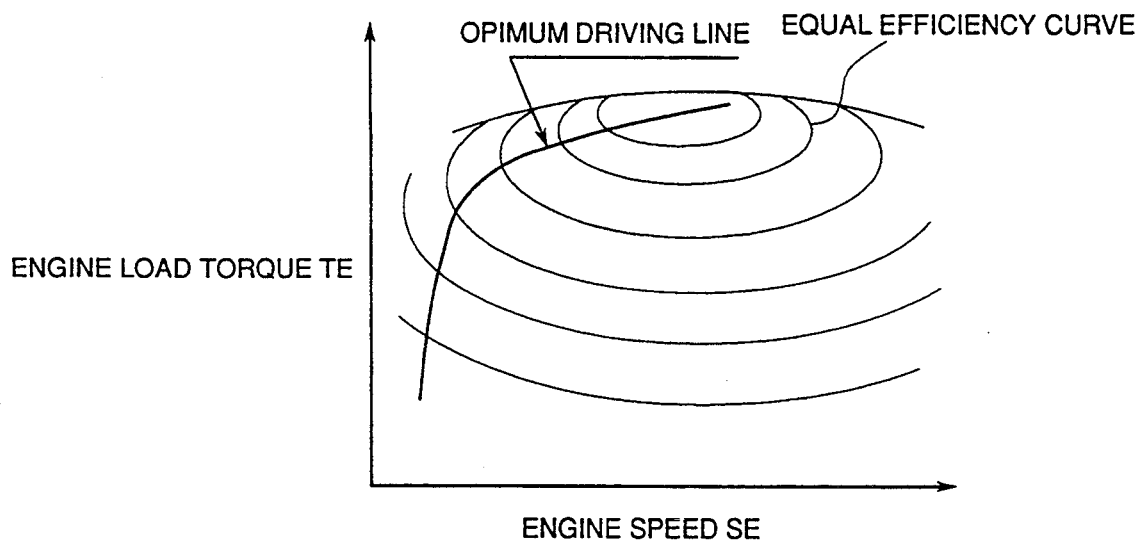
Figure 17:
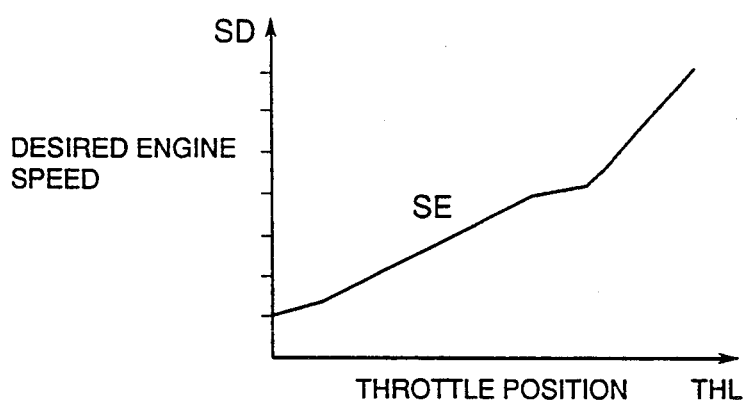

With the above arrangement and operation it is possible to eliminate the delay time from the time driver steps on the accelerator pedal to the time the vehicle starts moving, thereby to improve engine response and prevent rushing out of the vehicle. In particular, when the driver steps on the accelerator pedal 135 to start the vehicle, the acceleration modulator 140 causes the throttle valve 119a to be opened to the optimum position THL thereby to supply an optimum amount of fuel to the engine 119. Simultaneously with the above operation, the displacement DR of the hydraulic pump/motor 108 begins to be changed by the control of the pressure compensator 130 before the engine speed SE increases in such a manner that the output torque TG is kept at a set value corresponding to the amount ACL of operation on the accelerator pedal. In particular, with the hydraulic pump/motor 107 acting as a motor remaining stationary, intitially the displacement DR of the hydraulic pump/motor 108 acting as a pump slightly increases to produce an effective differential pressure $\Delta P$ ($P_0$) in the hydraulic circuit 131, whereupon the hydraulic pump/motor 107 begins to rotate as a motor swallowing hydraulic liquid. To compensate for the pressure drop in the effective differential pressure $\Delta P$ ($P_0$), the displacement DR of the hydraulic pump 108 further increases. The operation continues, so that from the moment the accelerator pedal 135 is stepped on the displacement DR of the hydraulic pump/motor 108 increases as the vehicle speed V increases. In this case, since the acceleration is approximately proportional to $DR \times P_0$, from the moment the accelerator pedal 135 has been stepped on a stable, effective traction force F can be obtained as shown in FIGS. 14 and 15, so that the vehicle begins to move. Thus it is possible to eliminate the time delay corresponding to the first order lag accompanied with loss time which existed before the engine speed SE rose in the prior art thereby to improve engine response.

In this case, the set pressure $P_0$ of the pressure compensator 130 is corrected so as to decrease as the displacement DR increases as shown in FIG. 13 as previously described. The reason is as follows: In the hydromechanical type, when the vehicle starts, most of the engine torque TE is transmitted through the hydraulic transmitting system A, with little of the torque being transmitted through the mechanical transmitting system a. As the displacement DR increases, however, the amount of torque transmitted through the mechanical transmitting system a gradually increases, so that provided that the set pressure $P_0$ of the pressure compensator 130 is kept constant, the torque which is transmitted through the mechanical transmitting system a and superimposed on the constant torque transmitted through the hydraulic transmitting system A gradually increases, so that an undesirable situation occurs in which the acceleration, that is, the traction force F increases as the speed ratio e increases as shown by dotted line in FIG. 14.

In the embodiment of the invention, however, since the set pressure $P_0$ is shifted so as to decrease as the displacement DR increases, an equivalent to the torque which is added through the mechanical transmitting system a to the torque transmitted through the hydraulic transmitting system A can be subtracted from the latter torque, so that the output torque TG, that is, the traction force F can be kept constant as shown by solid line in FIGS. 14 and 15 even when the speed ratio e and the vehicle speed V change in the first region.

With this control, it is not necessary to suddenly increase the displacement of the hydraulic pump/motor 108 to recover the delay in control after the engine output rises as in the prior art control, so that the feeling of rushing out is not experienced. In this manner the above-mentioned arrangement enables stable, smooth driving and changing of the speed. Since the throttle position THL is always kept by feed-forward control at an optimum value along the optimum driving line shown in FIG. 16, it is possible to control the engine 119 without overshooting when the vehicle starts even if there is no or little load on the engine, therey to effect proper control of the engine, prevent production of excess energy and realize low fuel consumption and low exhaust gas condition.

In addition to the above-mentioned function, in this embodiment it is possible somewhere in the second region to transfer to a control in which the speed ratio e, that is, the displacement DS of the hydraulic pump/motor 107 is changed so as to attain a desired engine speed SE corresponding to the amount ACL of operation on the accelerator pedal as is possible above the medium speed range in the prior art. In particular, the condition for the second region is so set that the engine speed Se becomes the optimum value SD for the throttle position THL regulated by the accelerator 135. As a result, the relation between the amount ACL of operation on the accelerator and the set pressure $P_0$ of the pressure compensator 130 becomes upwardly convex as shown in FIG. 13. This advantageously makes it possible to avoid a shock caused by a change in speed wherever the transfer is effected in the second region. If the transfer is to be automatically effected at a certain position, the time the displacement DS of the hydraulic pump/motor 108 has become smaller than the set value, the time the speed ratio e has become greater than the set valve, or the border between the low-speed mode and the high-speed mode may be taken as a reference, or the program in the electronic control unit may be changed in accordance with the purpose of control.

In the above-mentioned two embodiments, instead of the acceleration modulator 12 or 140, a subsidiary throttle valve may be provided in series with the throttle valve 4a or 19a, with an actuator for the subsidiary throttle valve being connected to the electronic control unit ECU to regulate the supply of fuel.

In the above-mentioned first embodiment, the set pressure $P_0$ increases in approximate proportion to the amount ACL of operation on the accelerator. If the above control is to be performed only in the range of $0 < e \leq 1$ and in the range of $1 < e$ the throttle position is to be changed so as to attain a desired engine speed corresponding to the amount ACL of operation on the accelerator as in the prior art control, the set pressure $P_0$ corresponding to the amount ACL of operation on the accelerator may advantageously be more or less modified as shown in phantom line in FIG. 3 so as to avoid a shock caused by a change in torque at the time of transfer of control.

In the above-mentioned two embodiments, the effective differential pressure $\Delta P$ is the differential pressure between the intake and outlet pressures of the hydraulic pump/motor. The differential pressure between the outlet pressure of the pump/motor and the atmospheric pressure, or the absolute value of the outlet pressure, that is, the differential pressure between the outlet pressure and zero pressure may also be used as the effective differential pressure. An overspeed governor used usually in a diesel engine may be used instead of the throttle control employed in the above-mentioned two embodiments.

Both the input and output pump/motors are of a variable displacement type in the embodiments. The input pump/motor only may be of a variable displacement type. The input and output pump/motors may have a different maximum displacement. The variable displacement type may be a swash plate type or a bent axis type. A servo mechanism using a hydraulic actuator or a stepping motor may be used as the means for changing the displacement.

Preferred embodiments of the invention having been described, the structures of the component parts are not restricted to the illustrated embodiments, but there may be various modifications without departing from the scope of the invention.

Figure 18:
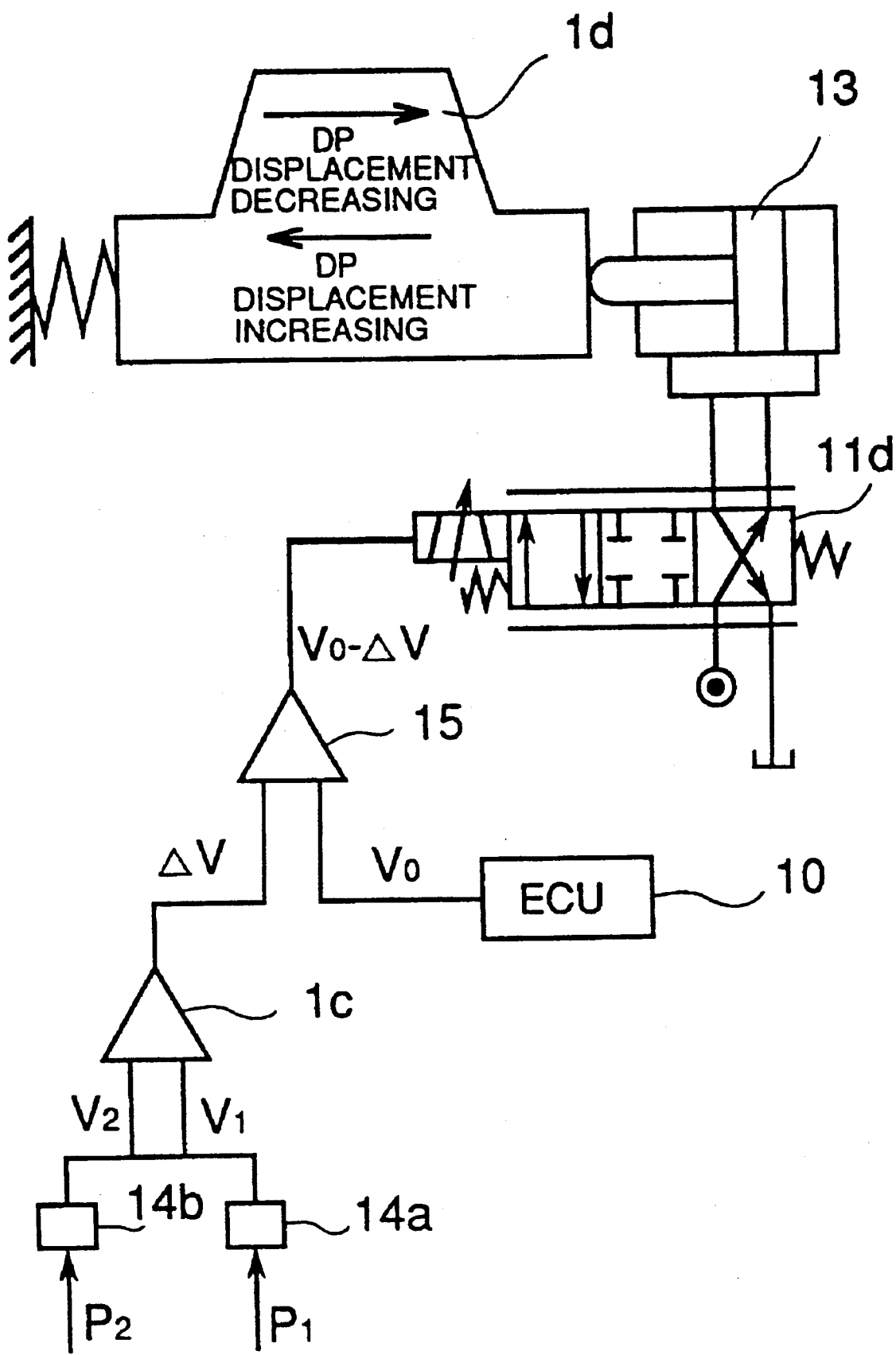
FIGS. 18 and 19 schematically show modified forms of the combination of displacement changing means and displacement controlling means.
Figure 19:
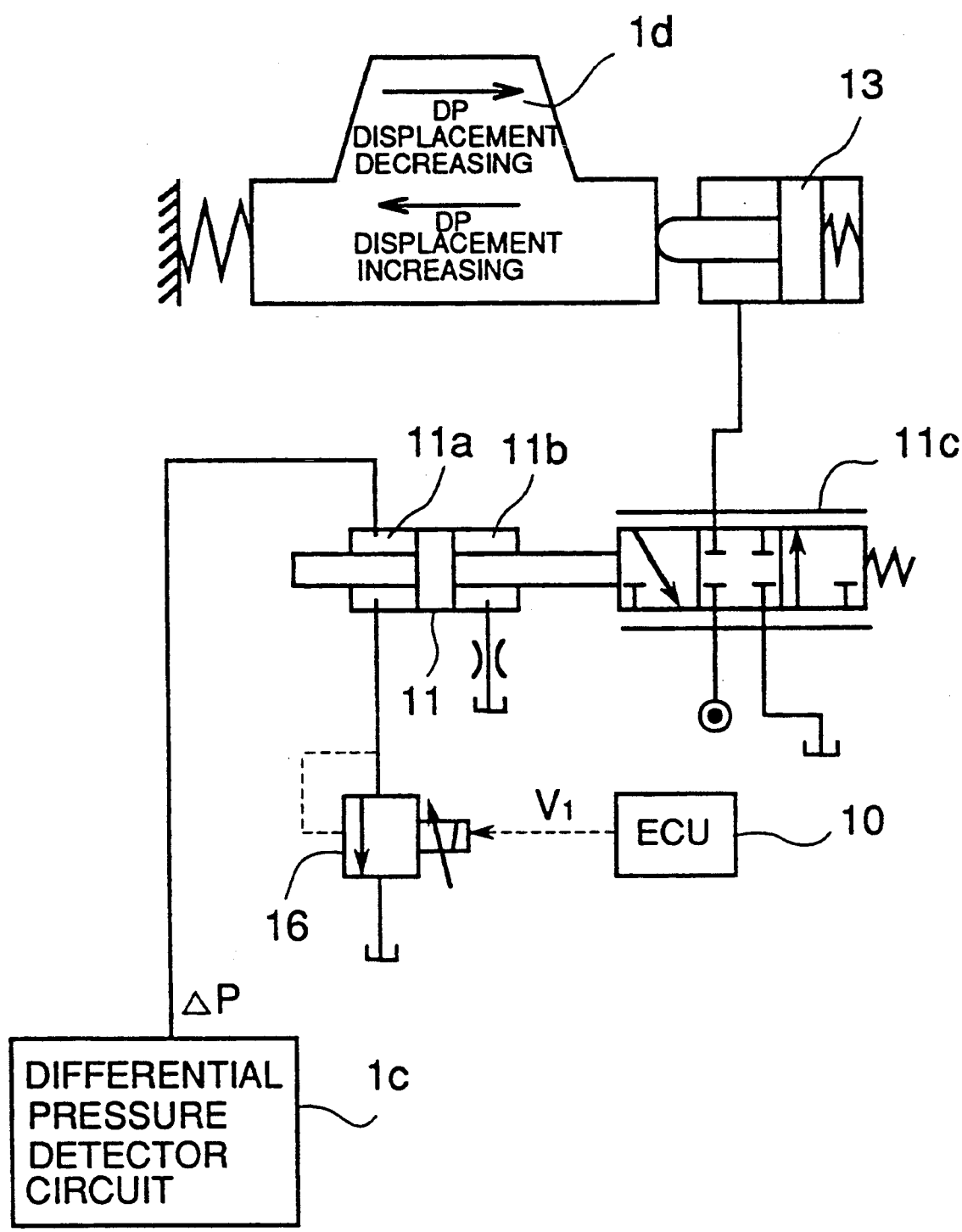

For example, the displacement changing means and the displacement controlling means can be of the construction shown in FIG. 18 or 19.

In the arrangement of FIG. 18, the displacement changing means comprises a hydraulic control cylinder 13, and the displacement controlling means comprises an electro-hydraulic servo valve 11$d$ for introducing hydraulic fluid of a predetermined pressure into the above-mentioned control cylinder 13, an electronic control unit ECU 10 for producing set voltage $V_0$ corresponding to the amount ACL of operation on the accelerator, and a comparator 15 for applying to the above-mentioned electro-hydraulic servo valve 11$d$ the difference $V_0-\Delta V$ between the set voltage $V_0$ produced by the ECU 10 and the voltage $\Delta V$ proportional to the effective differential pressure detected by the differential pressure detector 1$c$. In particular, while the ECU 10 produces the set voltage $V_0$ corresponding to the amount ACL of operation on the accelerator, the pressure sensors 14$a$ and 14$b$ detect the outlet and intake pressures $P_1$ and $P_2$, respectively, to produce corresponding voltages $V_1$ and $V_2$, and the differential pressure detector 1$c$ detects the difference between $V_1$ and $V_2$ to produce a corresponding differential pressure voltage $\Delta V$, so that the comparator 15 applies the differential voltage between the set voltage $V_0$ and the differential pressure voltage $\Delta V$ to the electro-hydraulic servo valve 11$d$ to actuate the valve 11$d$, whereupon hydraulic oil of a corresponding pressure is supplied to the control cylinder 13 to operate the pintle 1$d$ so as to render the differential voltage between the set voltage $V_0$ and the differential pressure voltage $\Delta V$ zero.

In the arrangement of FIG. 19, the displacement changing means comprises a hydraulic control cylinder 13, and the displacement controlling means comprises a servo valve 11$c$ for applying hydraulic fluid of a predetermined pressure to the above-mentioned hydraulic cylinder 13, a piston 11 on one side of which the effective differential pressure $\Delta P$ acts, an electronic control unit ECU 10 for producing a set voltage $V_1$ corresponding to the amount ACL of operation on the accelerator, and a relief valve 16 for reducing the effective differential pressure $\Delta P$ acting on the piston 11 when the pressure $\Delta P$ reaches the set pressure corresponding to the set voltage $V_1$ produced by the above-mentioned ECU 10. In particular, while the ECU 10 applies the set voltage $V_1$ corresponding to the amount ACL of operation on the accelerator to the electromagnetic pilot-operated relief valve 16, the differential pressure detector 1$c$ applies hydraulic fluid of the effective differential pressure $\Delta P$ to the one side 11$a$ of the piston 11, whereupon the servo valve 11$c$ moves to the right, so that the hydraulic fluid is discharged from the control cylinder 13 to move the pintle 1$d$ to the left. As the pintle 1$d$ moves to the left, the effective differential pressure $\Delta P$ increases to operate the electromagnetic pilot-operated relief valve 16 thereby to reduce the pressure on the left side 11$a$ of the piston 11, so that the servo valve 11$c$ begins to move to the left, whereupon hydraulic fluid flows into the control cylinder 13 to move the pintle 1$d$ to the right. In this manner, the pintle 1$d$ is controlled so that the effective differential pressure $\Delta P$ becomes equal to the set pressure of the electromagnetic pilot-operated relief valve 16.

POSSIBLE APPLICATIONS IN INDUSTRY

Since the invention has the construction described above, it is useful in application to automotive vehicles ranging from low-speed vehicles for industrial use such as tractors to high-speed vehicles such as passenger cars, particularly while working is done or the vehicle is running on an urban street, with repeated starting and stopping.

I claim:

1. A continuously variable transmission for use in a vehicle comprising a variable speed hydraulic transmitting system formed between a pair of hydraulic pump/motors at least one of which at an input side is of a variable displacement type and so constructed that with a displacement of said input hydraulic pump/motor acting as a pump being kept zero, a speed ratio of an output speed to an input speed can be rendered nearly zero; said transmission being characterized by the provision of: displacement changing means for changing displacement of said hydraulic pump/motors; detecting means for detecting an effective differential pressure in said hydraulic transmitting system: accelerator pedal position detecting means; and displacement controlling means for performing negative feedback control on said displacement changing means so that said effective differential pressure detected by said effective differential pressure detecting means is kept at a set pressure generally proportional to an accelerator pedal position detected by said accelerator pedal position detecting means with initial movement of said pedal to accelerate said vehicle.

2. The continuously variable transmission as in claim 1 and characterized by the provision of: displacement detecting means for detecting said displacement of said hydraulic pump/motor acting as a pump; calculating means for obtaining an engine load torque from said effective differential pressure in said hydraulic transmitting system and said displacement detected by said displacement detecting means; throttle position changing means for changing a throttle position; and throttle position controlling means for performing a feed-forward control on said throttle position changing means such that said throttle position becomes an optimum position for said engine load torque obtained by said calculating means.

3. The continuously variable transmission as in claim 2, wherein said throttle position changing means comprises a front wire portion one end of which is connected to an accelerator, a rear wire portion one end of which is connected to a throttle valve and an acceleration modulator composed of a differential gear interposed between said front and rear wire portions and so designed as to divide an output corresponding to an amount of operation of said accelerator pedal and to apply divided parts of said output to said throttle valve and a variable fixing device; and said throttle position controlling means comprises an electronic control unit for applying a control signal to an actuator for operating said variable fixing device.

4. The continuously variable transmission as in claim 3, wherein said displacement changing means comprises a hydraulic control cylinder; and said displacement controlling means comprises an electro-hydraulic servo valve for introducing and discharging hydraulic fluid of a predetermined pressure into and out of said hydraulic control cylinder, an electronic control unit for producing a set voltage corresponding to said accelerator pedal position, and a comparing circuit for producing a differential voltage between said set voltage produced by the electronic control unit and a voltage proportional to said effective differential pressure detected by a differential pressure detecting circuit as said effective differential pressure detecting means so as to be applied to said electro-hydraulic servo valve.

5. The continuously variable transmission as in claim 3, wherein said displacement changing means comprises a hydraulic control cylinder; and said displacement controlling means comprises a servo valve for introducing and discharging hydraulic fluid of a predetermined pressure into and out of said hydraulic control cylinder, a piston on one side of which an effective differential pressure acts, an electronic control unit for producing a set pressure signal corresponding to an accelerator pedal position, a relief valve for reducing said effective differential pressure acting on said piston when said effective differential pressure acting on the piston has reached said set pressure corresponding to said set pressure signal produced by said electronic control unit.

6. The continuously variable transmission as in claim 2, wherein said throttle position changing means comprises a main throttle valve one end of which is connected to an accelerator and a subsidiary throttle valve connected in series with said main throttle valve; and said throttle position controlling means comprises an electronic control unit for producing a control signal to be applied to an actuator for operating said subsidiary throttle valve.

7. The continuously variable transmission as in claim 6, wherein said displacement changing means comprises a hydraulic control cylinder; and said displacement controlling means comprises an electro-hydraulic servo valve for introducing and discharging hydraulic fluid of a predetermined pressure into and out of said hydraulic control cylinder, an electronic control unit for producing a set voltage corresponding to said accelerator pedal position, and a comparing circuit for producing a differential voltage between said set voltage produced by the electronic control unit and a voltage proportional to said effective differential pressure detected by a differential pressure detecting circuit as said effective differential pressure detecting means so as to be applied to said electro-hydraulic servo valve.

8. The continuously variable transmission as in claim 6, wherein said displacement changing means comprises a hydraulic control cylinder; and said displacement controlling means comprises a servo valve for introducing and discharging hydraulic fluid of a predetermined pressure into and out of said hydraulic control cylinder, a piston on one side of which an effective differential pressure acts, an electronic control unit for producing a set pressure signal corresponding to an accelerator pedal position, a relief valve for reducing said effective differential pressure acting on said piston when said effective differential pressure acting on the piston has reached said set pressure corresponding to said set pressure signal produced by said electronic control unit.

9. The continuously variable transmission as in claim 2, wherein said displacement changing means comprises a hydraulic control cylinder; and said displacement controlling means comprises a servo valve for introducing and discharging hydraulic fluid of a predetermined pressure into and out of said hydraulic control cylinder, a piston on opposite sides of which a pilot pressure and an effective differential pressure act, an electronic control unit for producing a set pressure signal corresponding to said accelerator pedal position, and a duty control valve connected to said hydraulic pump/motor acting as a pump to produce a pilot pressure in accordance with said set pressure signal, said piston, servo valve and duty control valve constituting a pressure compensator.

10. The continuously variable transmission as in claim 2, wherein said displacement changing means comprises a hydraulic control cylinder; and said displacement controlling means comprises an electro-hydraulic servo valve for introducing and discharging hydraulic fluid of a predetermined pressure into and out of said hydraulic control cylinder an electronic control unit for producing a set voltage corresponding to said accelerator pedal position, and a comparing circuit for producing a differential voltage between said set voltage produced by the electronic control unit and a voltage proportional to said effective differential pressure detected by a differential pressure detecting circuit as said effective differential pressure detecting means so as to be applied to said electro-hydraulic servo valve.

11. The continuously variable transmission as in claim 2, wherein said displacement changing means comprises a hydraulic control cylinder; and said displacement controlling means comprises a servo valve for introducing and discharging hydraulic fluid of a predetermined pressure into and out of said hydraulic control cylinder, a piston on one side of which an effective differential pressure acts, an electronic control unit for producing a set pressure signal corresponding to an accelerator pedal position, a relief valve for reducing said effective differential pressure acting on said piston when said effective differential pressure acting on the piston has reached said set pressure corresponding to said set pressure signal produced by said electronic control unit.

12. The continuously variable transmission as in claim 1, wherein said displacement changing means comprises a hydraulic control cylinder; and said displacement controlling means comprises an electro-hydraulic servo valve for introducing and discharging hydraulic fluid of a predetermined pressure into and out of said hydraulic control cylinder, an electronic control unit for producing a set voltage corresponding to said accelerator pedal position, and a comparing circuit for producing a differential voltage between said set voltage produced by the electronic control unit and a voltage proportional to said effective differential pressure detected by a differential pressure detecting circuit as said effective differential pressure detecting means so as to be applied to said electro-hydraulic servo valve.

13. The continuously variable transmission as in claim 1, wherein said displacement changing means comprises a hydraulic control cylinder; and said displacement controlling means comprises a servo valve for introducing and discharging hydraulic fluid of a predetermined pressure into and out of said hydraulic control cylinder, a piston on one side of which an effective differential pressure acts, an electronic control unit for producing a set pressure signal corresponding to an accelerator pedal position, a relief valve for reducing said effective differential pressure acting on said piston when said effective differential pressure acting on the piston has reached said set pressure corresponding to said set pressure signal produced by said electronic control unit.

14. The continuously variable transmission as in claim 1, wherein said displacement changing means comprises a servo mechanism using a stepping motor.

15. A continuously variable transmission for use in a vehicle comprising: a differential mechanism having a first, a second and a third input/output terminal, a low-speed mechanical transmitting system between said first and second input/output terminals and a high-speed mechanical transmitting system between said first and third input/output terminals; a hydraulic transmitting mechanism comprising a hydraulic pump/motor of a variable displacement type with an input/output shaft of which is connected to said second input/output terminal of said differential mechanism and another hydraulic pump/motor of a variable displacement type with another input/output shaft of which is connected to said third input/output terminal thereby to form a variable speed hydraulic transmitting system; a low-speed clutch for connecting and disconnecting a transmitting terminal of said low-speed mechanical transmitting system to and from a rotary element provided at an output side of said low-speed mechanical transmitting system; and a high-speed clutch for connecting and disconnecting a transmitting terminal of said highspeed mechanical transmitting system to and from a rotary element provided at an output side of said high-speed mechanical transmitting system, whereby low-speed and high-speed modes of operation are selectable according to operating a respective one of said clutches; said continuously variable transmission being characterized by the provision of: displacement changing means for changing displacements of said hydraulic pump/motors; detecting means for detecting an effective differential pressure in said hydraulic transmitting system; means for detecting positioning of an accelerator pedal; displacement controlling means for performing a negative feedback control on said displacement changing means of said hydraulic pump/motor acting as a pump such that in said low-speed mode said effective differential pressure detected by said differential pressure detecting means is kept at a set pressure corresponding to an accelerator pedal position detected by said accelerator pedal positioning detecting means; and set pressure correcting means for correcting, when in a first region of said low-speed mode where pump displacement of said hydraulic pump/motor acting as a pump is kept below a maximum value, said set pressure to a corrected value as a function of at least one of said pump displacement and a speed ratio such that an output torque is kept substantially constant in correspondence to said positioning of said accelerator pedal provided that said accelerator pedal position is constant in said first region and for keeping said corrected value of said set pressure when in a second region of said low-speed mode where said pump displacement of said hydraulic pump/motor is maximum and a motor displacement of said other hydraulic pump/motor acting as a motor is kept below a maximum value.

16. The continuously variable transmission as in claim 15 and characterized by the provision of: displacement detecting means for detecting said pump displacement of said hydraulic pump/motor acting as a pump; calculating means for obtaining an engine load torque from said effective differential pressure in said hydraulic transmitting system and said pump displacement detected by said displacement detecting means; throttle position changing means for changing a throttle position; and throttle position controlling means for performing a feed-forward control on said throttle position changing means such that said throttle position becomes an optimum position for said engine load torque obtained by said calculating means.

17. The continuously variable transmission as in claim 15, wherein said displacement changing means comprises a hydraulic control cylinder; and said displacement controlling means comprises an electro-hydraulic servo valve for introducing and discharging hydraulic fluid of a predetermined pressure into and out of said hydraulic control cylinder, an electronic control unit for producing a set voltage corresponding to said accelerator pedal position, and a comparing circuit for producing a differential voltage between said set voltage produced by the electronic control unit and a voltage proportional to said effective differential pressure detected by a differential pressure detecting circuit as said effective differential pressure detecting means so as to be applied to said electro-hydraulic servo valve.

18. The continuously variable transmission as in claim 15, wherein said displacement changing means comprises a hydraulic control cylinder; and said displacement controlling means comprises a servo valve for introducing and discharging hydraulic fluid of a predetermined pressure into and out of said hydraulic control cylinder, a piston on one side of which an effective differential pressure acts, an electronic control unit for producing a set pressure signal corresponding to an accelerator pedal position, a relief valve for reducing said effective differential pressure acting on said piston when said effective differential pressure acting on the piston has reached said set pressure corresponding to said set pressure signal produced by said electronic control unit.

19. The continuously variable transmission as in claim 15, wherein said displacement changing means comprises a servo mechanism using a stepping motor.

* * * * *